United States Patent [19]

Sawyer et al.

[11] Patent Number: 5,920,814

[45] Date of Patent: Jul. 6, 1999

[54] SYSTEM AND METHOD OF MANAGING TEMPORARY MOBILE STATION IDENTITY (TMSI) PARAMETERS IN A RADIO TELECOMMUNICATIONS NETWORK

[75] Inventors: Francois Sawyer, St-Hubert; Eric Turcotte, Verdun, both of Canada

[73] Assignee: Telefonaktiebolaget, Stockholm, Sweden

[21] Appl. No.: 08/845,960

[22] Filed: Apr. 30, 1997

[51] Int. Cl.$^6$ .............................. H04Q 7/30; H04Q 7/38
[52] U.S. Cl. ......................... 455/422; 455/422; 455/436
[58] Field of Search ................................... 455/422, 436

[56] References Cited

U.S. PATENT DOCUMENTS

| | | | |
|---|---|---|---|
| 5,210,787 | 5/1993 | Hayes et al. | 455/435 |
| 5,375,251 | 12/1994 | Pfundstein | 455/33.4 |
| 5,384,824 | 1/1995 | Alvesalo | 379/59 |
| 5,396,543 | 3/1995 | Beeson, Jr. et al. | 455/560 |
| 5,497,412 | 3/1996 | Lannen et al. | 455/432 |
| 5,734,645 | 3/1998 | Raith et al. | 370/329 |
| 5,754,955 | 5/1998 | Ekbatani | 455/422 |

FOREIGN PATENT DOCUMENTS

WO 96/04759 of 0000 WIPO .

OTHER PUBLICATIONS

M. Mouly and M.B. Pautet; "The GSM System for Mobile Communications"; 1992; pp. 489–492; Palaiseau, France XP002080984.

"Temporary Mobile Station Identify (TMSI)—Stage 2 Description (rev 0.3)", *Qualcomm Incorporated*, Dec. 11, 1995.

*Primary Examiner*—Dwayne D. Bost
*Assistant Examiner*—Alan Gantt
*Attorney, Agent, or Firm*—Smith & Danamraj, P.C.

[57] ABSTRACT

A system and method of managing Temporary Mobile Station Identity (TMSI) parameters in a radio telecommunications network having a first mobile switching center (MSC), a second MSC, and a mobile station operating initially in a service area of the first MSC. A first Validity Area Parameter (VAP) is transmitted from the first MSC and a second VAP is transmitted from the second MSC. The first MSC then assigns a first TMSI to the mobile station, and utilizes the first TMSI to identify the mobile station while the mobile station operates within the service area of the first MSC. The mobile station then determines whether it is receiving the second VAP, and invalidates the first TMSI upon determining that the mobile station is receiving the second VAP. The mobile station then registers in the second MSC utilizing the mobile station's Mobile Identification Number (MIN). The second MSC then assigns a second TMSI to the mobile station which is utilized to identify the mobile station while the mobile station operates within the service area of the second MSC. In an alternative embodiment, TMSIs are allocated by each visitor location register (VLR) in the network, and a single TMSI is utilized to identify the mobile station in all MSCs associated with the allocating VLR.

16 Claims, 4 Drawing Sheets

SYSTEM AND METHOD OF MANAGING TEMPORARY MOBILE STATION IDENTITY (TMSI) PARAMETERS IN A RADIO TELECOMMUNICATIONS NETWORK

BACKGROUND OF THE INVENTION

1. Technical Field of the Invention

This invention relates to radio telecommunication systems and, more particularly, to a system and method of managing Temporary Mobile Station Identity (TMSI) parameters in a radio telecommunications network.

2. Description of Related Art

In existing radio telecommunications networks, there is a parameter known as a Temporary Mobile Station Identity (TMSI) which is utilized to identify a mobile station operating within a network. The TMSI is allocated by the network operator. It is advantageous for two reasons to utilize a TMSI to identify a mobile station. First, greater signaling capacity is achieved because the TMSI utilizes fewer bits to identify the mobile station than is utilized by the mobile station's Mobile Identification Number (MIN). For example, in the Digital Advanced Mobile Phone System (D-AMPS), which operates under IS-136, the shortest TMSI is 20 bits long while the MIN is 34 bits in length. This increased signaling capacity is reflected in greater paging capacity as well as reduced overhead and greater payload capacity in each message. The advantage can be illustrated when paging for a mobile station. There are a certain number of time slots that can be utilized, and when using TMSIs to identify mobile stations, up to five mobile stations can be paged in the same slot. When using MINs to identify the mobile stations, however, only three can be paged.

The use of a TMSI also enhances mobile station identification confidentiality. The use of a TMSI makes it more difficult for a fraudulent user to obtain a mobile station's MIN by monitoring broadcast signals. The fraudulent user may obtain the mobile station's TMSI, but the TMSI will probably remain valid for only a short period of time.

The current air interface standard covering the signaling between mobile stations and the network is IS-136. The Intersystem Signaling standard covering the signaling between mobile switching centers (MSCs) is IS-41. The IS-136 air interface standard and the IS-41 Intersystem Signaling standard are hereby incorporated by reference herein. The IS-136 standard, however, has a deficiency regarding the management of TMSIs in the network. Each MSC assigns its own TMSIs to mobile stations operating within the MSC's service area. If a mobile station is assigned a TMSI in a first MSC and then moves into the service area of a second MSC operating with the same System Identity (SID), the mobile station attempts to register in the second MSC utilizing the TMSI assigned by the first MSC. However, the second MSC cannot recognize the TMSI assigned by the first MSC. Therefore, the second MSC cannot identify the mobile station and does not know which HLR to access to retrieve subscriber information. This unsuccessful registration attempt results in a Registration Reject from the second MSC, thereby forcing the mobile station to attempt the registration a second time utilizing its permanent MIN. Thus, there is additional signaling and lost time because the mobile station was not recognized on the first registration attempt in the second MSC.

Although there are no known prior art teachings of a solution to the aforementioned deficiency and shortcoming such as that disclosed herein, two known references discuss subject matter that bears some relation to matters discussed herein. U.S. Pat. No. 5,275,271 to Pfundstein (Pfundstein) discloses a method of structuring a TMSI from a permanent mobile station identity signal (International Mobile Station Identity (IMSI) in the GSM system) to allow fast access to a database. However, Pfundstein does not teach or suggest a solution to the aforementioned deficiency with respect to the management of the TMSI in a network.

A second reference is a standards contribution entitled, "Temporary Mobile Station Identity (TMSI)—Stage 2 Description (rev. 0.3)" from Qualcomm Incorporated (the Contribution). The Contribution proposes a solution to the aforementioned deficiency by passing the mobile station's TMSI from the serving MSC to neighboring MSCs. However, the proposed solution is a complicated scheme in which the network keeps track of each mobile station's TMSI as the mobile station moves from one MSC to another. The Contribution defines the TMSI in such a way that it can be reused by a new serving MSC. However, the Contribution does not just impact the structure of the TMSI. Additional intersystem signaling is required to convey TMSI information from one MSC to another, and to the home location register (HLR).

It is very complicated to maintain a TMSI while a mobile station moves from MSC to MSC. TMSI information must be passed between MSCs, and TMSIs must be structured with prefixes to identify in which MSC the mobile station is operating, etc. Thus, there is adverse impact on the level of required intersystem (IS-41) signaling between MSCs. In order to reuse the TMSI in a new MSC, the Contribution requires a complicated, burdensome scheme which defines neighboring MSCs and requests information from the neighboring MSCs and visitor location registers (VLRs), in order to associate a TMSI with a mobile station and a HLR.

In order to overcome the deficiency in IS-136 and the disadvantages of the solution proposed in the Contribution, it would be advantageous to have a method of managing TMSIs in a radio telecommunications network that does not require a complicated scheme of neighboring MSCs and additional burdensome IS-41 signaling.

Review of each of the foregoing references reveals no disclosure or suggestion of a system or method such as that described and claimed herein.

SUMMARY OF THE INVENTION

In one aspect, the present invention is a method of managing Temporary Mobile Station Identity (TMSI) parameters in a radio telecommunications network having a first mobile switching center (MSC), a second MSC, and a mobile station operating initially in a service area of the first MSC. The method begins by transmitting a first Validity Area Parameter (VAP) from the first MSC, assigning by the first MSC a first TMSI to the mobile station, and utilizing the first TMSI to identify the mobile station while the mobile station operates within the service area of the first MSC. The second MSC transmits a second VAP. This is followed by determining whether the mobile station is receiving the second VAP, invalidating the first TMSI upon determining that the mobile station is receiving the second VAP, triggering a registration of the mobile station in the second MSC utilizing the mobile station's Mobile Identification Number (MIN). The second MSC then assigns a second TMSI to the mobile station which is utilized to identify the mobile station while the mobile station operates within the service area of the second MSC.

In another aspect, the present invention is a method of managing Temporary Mobile Station Identity (TMSI)

parameters in a radio telecommunications network in which the TMSIs are allocated by the Visitor Location Registers (VLRs) in the network. The network includes a first visitor location register (VLR-1) which is associated with a first mobile switching center (MSC-1) and a second mobile switching center (MSC-2). The network also includes a second visitor location register (VLR-2) which is associated with a third mobile switching center (MSC-3). A mobile station operates initially in a service area of MSC-1. The method begins by assigning, by the VLR-1, a TMSI to the mobile station, and transmitting a first VAP from the MSC-1 to the mobile station. The method also transmits the first VAP from MSC-2. A second VAP is transmitted from MSC-3. This is followed by utilizing the TMSI to identify the mobile station while the mobile station operates within the service area of the VLR-1, which corresponds to the first VAP. The mobile station determines whether it is still receiving the first VAP, and upon determining that it is not, the mobile station invalidates the TMSI and utilizes a permanent identification to identify the mobile station.

In yet another aspect, the present invention is a system for managing Temporary Mobile Station Identity (TMSI) parameters in a radio telecommunications network having a first mobile switching center (MSC), a second MSC, and a mobile station operating initially in a service area of the first MSC. The system includes a first TMSI allocation unit within the first MSC which assigns a first TMSI to the mobile station, and a first Validity Area Parameter (VAP) transmitter within the first MSC which transmits a first VAP and the first TMSI from the first MSC to the mobile station. A second VAP transmitter within the second MSC transmits a second VAP from the second MSC to the mobile station. Included within the mobile station are a mobile station identity (MSI) controller which utilizes the first TMSI to identify the mobile station while the mobile station operates within the service area of the first MSC, a VAP receiver for determining whether the mobile station is receiving the second VAP, a TMSI status module for determining whether the received TMSI is valid, and a selector for selecting the received TMSI to identify mobile station upon determining that the received TMSI is valid, and for selecting a permanent identification to identify the mobile station upon determining that the received TMSI is not valid.

In yet another aspect, the present invention is a system for managing Temporary Mobile Station Identity (TMSI) parameters in a radio telecommunications network in which the TMSIs are allocated by the Visitor Location Registers (VLRs) in the network. The network includes a first visitor location register (VLR-1) which is associated with a first mobile switching center (MSC-1) and a second MSC (MSC-2). A second VLR (VLR-2) is associated with a third MSC (MSC-3). MSC-1 and MSC-2 broadcast a first SID ($SID_1$) value, and MSC-3 broadcasts a second SID ($SID_2$) value. A mobile station operates initially in a service area of MSC-1.

The system comprises a first TMSI allocation unit within the VLR-1 which assigns a first TMSI ($TMSI_1$) to the mobile station. Upon TMSI assignment, the mobile station reads and associates the VAP ($VAP_1$) and the SID ($SID_1$) broadcast by the serving MSC (MSC-1) to $TMSI_1$ just assigned. While the mobile station is receiving $VAP_1$ and $SID_1$ (i.e., within the serving areas of MSC-1 and MSC-2), the mobile station utilizes the assigned $TMSI_1$. When the mobile station enters the serving area of MSC-3, it detects that the VAP broadcast (i.e., $VAP_1$) is the same, but the SID broadcast (i.e., $SID_2$) is different than the SID associated with its assigned $TMSI_1$ (i.e., $SID_1$). This invalidates the assigned $TMSI_1$. This further triggers the mobile station to send a registration to MSC-3 using its MIN. The VLR-2 can then assign a new TMSI to the mobile station. Utilizing the SID to invalidate the assigned TMSI, as outlined in this aspect of the present invention, allows the VAP to be reused from one SID-area to another without coordination of VAPs between the SID-areas. Furthermore, it reduces the VAP range, thus reducing the number of bits required to express a VAP value.

BRIEF DESCRIPTION OF THE DRAWINGS

The invention will be better understood and its numerous objects and advantages will become more apparent to those skilled in the art by reference to the following drawing, in conjunction with the accompanying specification, in which.

DETAILED DESCRIPTION OF EMBODIMENTS

The present invention designates a condition under which the TMSI becomes invalid, and the mobile station reverts to using its permanent Mobile Identification Number (MIN). The condition is used as a registration trigger in the mobile station. The mobile station then registers with its permanent MIN to allow the network to identify the mobile station requiring service.

The present invention passes the TMSI information only over the air interface between the mobile station and a single MSC. The TMSI information is not passed between MSC/VLRs. The mobile station invalidates its TMSI and reverts to utilizing a permanent mobile station identity such as its MIN when it passes into the operating area of another MSC/VLR. In systems utilizing the International Mobile Station Identity (IMSI), this permanent identity may also be utilized. Each MSC/VLR broadcasts a unique TMSI Validity Area Parameter (VAP) within its service area. When the mobile station receives a VAP that is different from the VAP of its serving MSC/VLR, the mobile station is triggered to register in the new MSC/VLR utilizing its permanent MIN.

The VAP is a general information broadcast from each MSC/VLR. The VAP may be added as a new information element in, for example, the Digital Control Channel (DCCH) Broadcast (BCCH). When the mobile station moves from the service area of one MSC/VLR to a new MSC/VLR, it receives a new VAP. Whenever the mobile station is receiving a valid VAP and then receives a different VAP on the BCCH, the mobile station then invalidates its TMSI, and uses its MIN to register in the new MSC/VLR. The old serving MSC/VLR may then dynamically reallocate the TMSI to another mobile station.

Figure 1A:
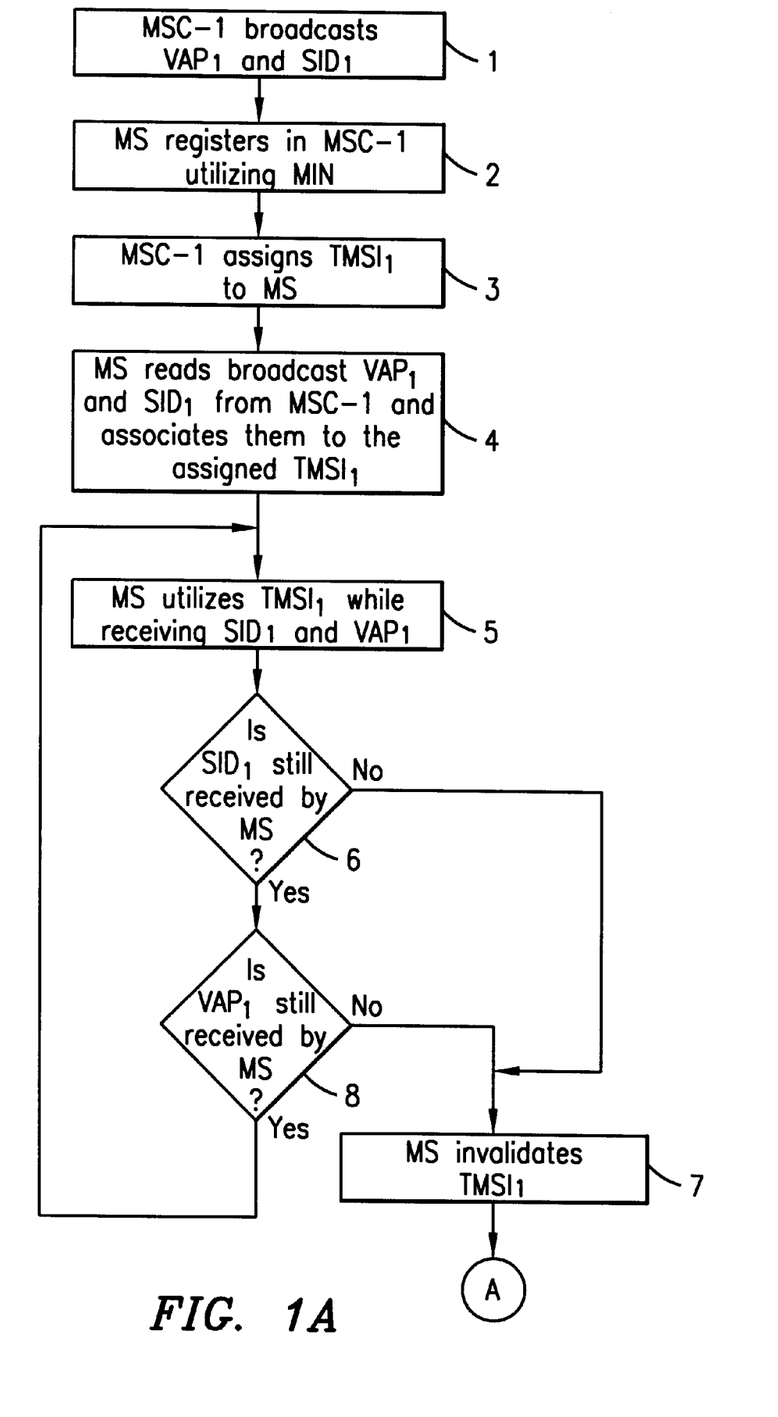
FIGS. 1A and 1B are a flow chart illustrating the steps in the preferred embodiment of the method of the present invention.
Figure 1B:
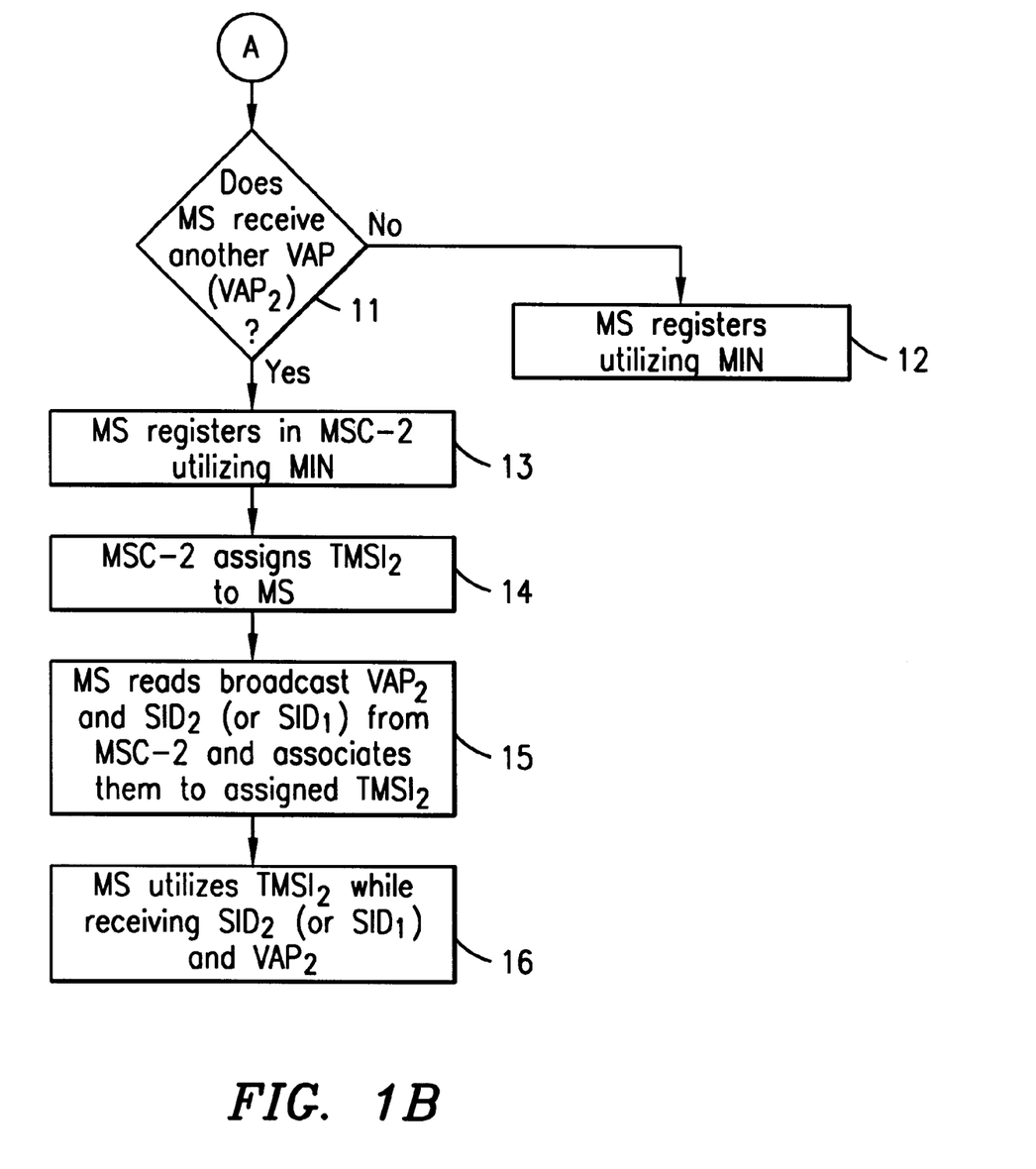

Referring now to FIGS. 1A and 1B, there is shown a flow chart illustrating the steps in the preferred embodiment of the method of the present invention. At step 1, MSC-1 broadcasts a unique Validity Area Parameter ($VAP_1$) and System Identity ($SID_1$). At step 2, a mobile station registers in MSC-1 utilizing its MIN. At step 3, MSC-1 assigns $TMSI_1$ to the mobile station for use while in the serving area of MSC-1. At step 4, the mobile station reads the broadcast $VAP_1$ and $SID_1$ from MSC-1, and associates them to the assigned $TMSI_1$. The mobile station then utilizes $TMSI_1$ at step 5 while receiving $VAP_1$ and $SID_1$.

The method then moves to step 6 where it is determined whether the mobile station is still receiving $SID_1$. If not, the method moves to step 7 where the mobile station invalidates $TMSI_1$. If, however, it is determined that the mobile station is still receiving $SID_1$, the method moves to step 8 where it is determined whether the mobile station is still receiving $VAP_1$. If the mobile station is still receiving $VAP_1$, the method returns to step 5 and the mobile station continues to utilize $TMSI_1$ while receiving $VAP_1$ and $SID_1$. If the mobile station is not still receiving $VAP_1$, the method moves to step 7 where the mobile station invalidates $TMSI_1$. The method then moves to step 11 in FIG. 1B.

At step 11, it is determined whether the mobile station is receiving another VAP (e.g., a VAP from another MSC such as $VAP_2$ from MSC-2). If not, the method moves to step 12 where the mobile station registers utilizing its MIN. If, however, it is determined at step 11 that the mobile station is receiving a VAP different from $VAP_1$ (for example $VAP_2$ from MSC-2), the process moves to step 13 where the mobile station registers in MSC-2 utilizing its MIN. At step 14, MSC-2 assigns $TMSI_2$ to the mobile station, and at 15, the mobile station reads the broadcast $VAP_2$ and the SID that it is receiving, and associates them with the assigned $TMSI_2$. The mobile station may be receiving either $SID_1$ or $SID_2$ at this time. At step 16, the mobile station utilizes $TMSI_2$ while receiving $SID_1$ or $SID_2$ and $VAP_2$.

Figure 2:
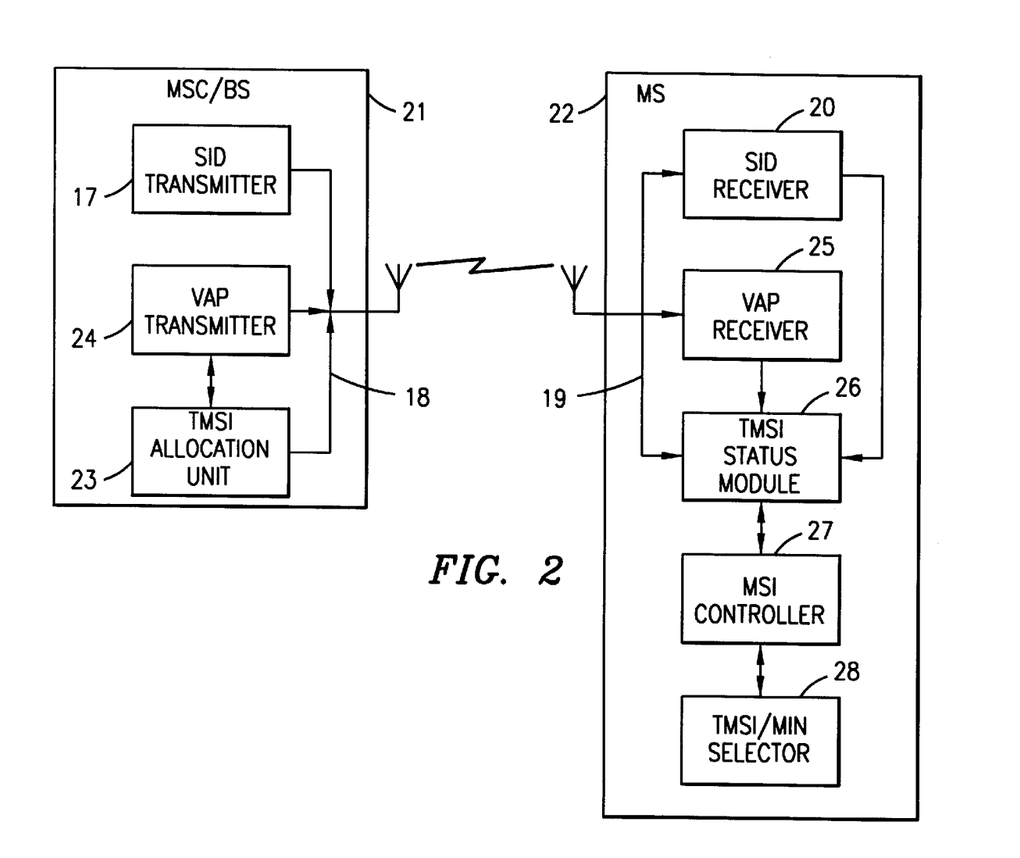
FIG. 2 is a simplified block diagram of one embodiment of the components of a radio telecommunications network in which the system of the present invention has been implemented.

FIG. 2 is a simplified block diagram of one embodiment of the components of a radio telecommunications network in which the system of the present invention has been implemented. A MSC and its associated base station (BS) are illustrated for simplicity as a single MSC/BS 21. The MSC/BS 21 is in radio contact with a mobile station (MS) 22.

A TMSI Allocation Unit (TAU) 23 is implemented within the MSC/BS 21. The TAU 23 allocates a unique TMSI to each mobile station operating within the service area of the MSC/BS 21. A VAP transmitter 24 transmits on the broadcast channel the desired VAP value. A SID transmitter 17 transmits on the broadcast channel the desired SID value. The TMSI allocated to MS 22 is sent from the TAU 23 on the control channel via a point-to-point MSC-to-MS transaction as a response to a mobile station registration. This follows path 18 in the MSC/BS 21. The MS 22 receives the assigned TMSI in a TMSI Status Module 26 via path 19 in the MS 22. The TMSI Status Module, upon detecting a valid TMSI, fetches the VAP and the SID currently broadcast by the MSC/BS 21 from its VAP receiver 25 and its SID receiver 20, and then stores the assigned TMSI, the received VAP, and the received SID. The TMSI Status Module 26 reports to a Mobile Station Identity (MSI) Controller 27 whether the TMSI was valid. If the TMSI was valid, the MSI Controller 27 instructs a TMSI/MIN Selector 28 to utilize the TMSI for identification purposes. If the TMSI was invalid, or the currently received VAP did not match the VAP stored when the TMSI was assigned, or the currently received SID did not match the SID stored when the TMSI was assigned, the MSI Controller 27 instructs the TMSI/MIN Selector 28 to utilize the mobile station's MIN for identification purposes.

Figure 2A:
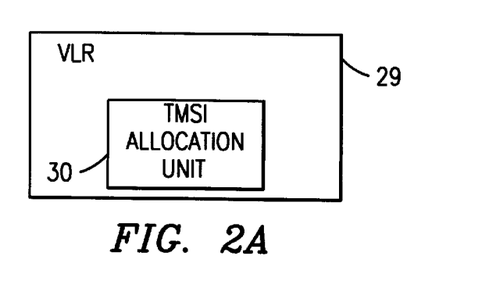
FIG. 2A is a simplified block diagram of a Visitor Location Register (VLR) in which a TMSI Allocation Unit is implemented.

FIG. 2A is a simplified block diagram of a Visitor Location Register (VLR) 29 in which a TMSI Allocation Unit 30 is implemented. The Validity Area Parameter (VAP) may be allocated at the VLR level of the radio telecommunications network. In this case, the TMSI Allocation Unit is located in the VLR rather than in each individual MSC, and allocates TMSIs for all associated MSCs.

Figure 3:
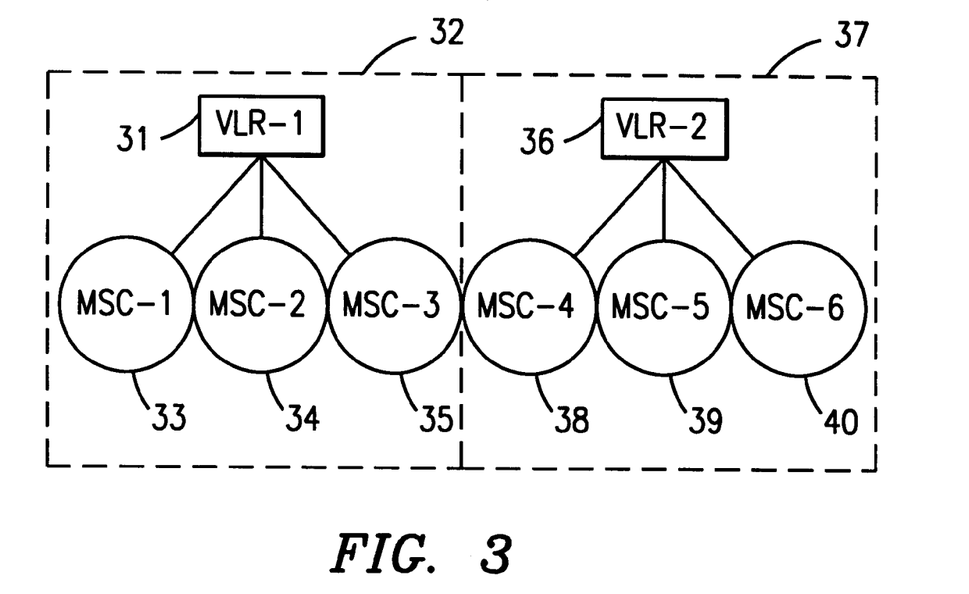
FIG. 3 is an illustrative drawing of the service areas of two VLRs, each having a plurality of associated MSCs, the VLR areas being suitable for implementing VAPs at the VLR level.

FIG. 3 is an illustrative drawing of the service area of two VLRs, each with a plurality of associated MSCs, which are suitable for implementing VAPs at the VLR level. VLR-1 (31) is shown to have a service area 32 which includes MSC-1 (33), MSC-2 (34), and MSC-3 (35). VLR-2 (36) is shown to have a service area 37 which includes MSC-4 (38), MSC-5 (39), and MSC-6 (40).

VLR-1 and VLR-2 are each allocated a different System Identification (SID) number. For example, VLR-1 may have a SID=15,399 while VLR-2 has a SID=16,401. Each MSC transmits the SID of its associated VLR along with its VAP. The VAP is unique to the transmitting MSC within the service area of its associated VLR. For example, MSC-1 (33) transmits $VAP_1$, which has a different value from $VAP_2$ or $VAP_3$ transmitted by MSC-2 (34) or MSC-3 (35), respectively.

Logically, the combination of the VLR's SID and the MSC's VAP value provide a SID-specific VAP. A VAP value from a MSC in VLR area 32 may be utilized by a MSC in VLR area 37, and still provide a unique SID-specific VAP due to the different SIDs allocated to VLR-1 and VLR-2. The table below shows exemplary values for SIDs and MSC VAP values for the network illustrated in FIG. 2.

| VLR-1 SID = 15,399 | | | VLR-2 SID = 16,401 | | |
|---|---|---|---|---|---|
| MSC-1 | MSC-2 | MSC-3 | MSC-4 | MSC-5 | MSC-6 |
| 13 | 14 | 15 | 15 | 14 | 13 |

In this exemplary network, the MSCs in each VLR area have repetitive VAP values, but have unique SID-specific VAPs. For example, MSC-3 (35) utilizes a VAP value of 15, and MSC-4 (38) also utilizes a VAP value of 15. In this example, the SID-specific VAP for MSC-3 is 15,399/15 while the SID-specific VAP for MSC-4 is 16,401/15. Therefore, a mobile station entering a MSC with a new SID recognizes any MSC VAP value, even the MSC VAP value it was utilizing, as a new VAP.

The utilization of SID-specific VAPs has the advantage of reducing the range of values required for the VAP, thus reducing the number of bits required to code the VAP. This minimizes the bandwidth required to transmit the VAP on the air interface. Furthermore, another advantage of having SID specific VAPs is that there is no need to have VAP coordination on SID area boundaries, since MSs having TMSIs always invalidate their TMSI when going to a different SID area even if the VAP value there is the same.

It is thus believed that the operation and construction of the present invention will be apparent from the foregoing description. While the method, apparatus and system shown and described has been characterized as being preferred, it will be readily apparent that various changes and modifications could be made therein without departing from the spirit and scope of the invention as defined in the following claims.

What is claimed is:

1. A method of managing Temporary Mobile Station Identity (TMSI) parameters in a radio telecommunications network having a first mobile switching center (MSC), a second MSC, and a mobile station operating initially in a service area of said first MSC, said method comprising the steps of:

transmitting a first Validity Area Parameter (VAP) from said first MSC and a second VAP from said second MSC;

assigning, by said first MSC, a first TMSI to said mobile station;

utilizing said first TMSI to identify said mobile station while said mobile station operates within the service area of said first MSC;

determining whether said mobile station is receiving said second VAP;

invalidating said first TMSI upon determining that said mobile station is receiving said second VAP; and     utilizing a permanent identification to identify said mobile station while said mobile station operates within the service area of said second MSC.

2. The method of managing Temporary Mobile Station Identity (TMSI) parameters in a radio telecommunications network of claim 1 further comprising the steps of:

registering said mobile station in said second MSC utilizing said permanent identification for said mobile station; and     assigning, by said second MSC, a second TMSI to said mobile station.

3. The method of managing Temporary Mobile Station Identity (TMSI) parameters in a radio telecommunications network of claim 1 wherein said step of transmitting a first Validity Area Parameter (VAP) from said first MSC and a second VAP from said second MSC includes transmitting said first VAP on the Digital Control Channel of said first MSC and transmitting said second VAP on the Digital Control Channel of said second MSC.

4. The method of managing Temporary Mobile Station Identity (TMSI) parameters in a radio telecommunications network of claim 2 wherein said step of registering said mobile station in said second MSC utilizing a permanent identification for said mobile station includes registering said mobile station with said mobile station's Mobile Identification Number (MIN).

5. The method of managing Temporary Mobile Station Identity (TMSI) parameters in a radio telecommunications network of claim 2 wherein said step of registering said mobile station in said second MSC utilizing a permanent identification for said mobile station includes registering said mobile station with said mobile station's International Mobile Station Identity (IMSI).

6. A method of managing Temporary Mobile Station Identity (TMSI) parameters in a radio telecommunications network having a first mobile switching center (MSC) which transmits a Validity Area Parameter (VAP), a second MSC which does not transmit a VAP, and a mobile station operating initially in a service area of said first MSC, said method comprising the steps of:

assigning, by said first MSC, a TMSI to said mobile station;

transmitting said VAP and said TMSI from said first MSC to said mobile station;

utilizing said TMSI to identify said mobile station while said mobile station operates within the service area of said first MSC;

determining whether said mobile station is still receiving said VAP;

invalidating said TMSI upon determining that said mobile station is not receiving said VAP; and     utilizing a permanent identification to identify said mobile station.

7. A method of managing Temporary Mobile Station Identity (TMSI) parameters in a radio telecommunications network having a first mobile switching center (MSC-1), a second mobile switching center (MSC-2), and a mobile station operating initially in a service area of said MSC-1, said method comprising the steps of:

assigning, by said MSC-1, a first TMSI ($TMSI_1$) to said mobile station;

sending said $TMSI_1$ to said mobile station;

transmitting a first System Identification ($SID_1$) number from said MSC-1 to said mobile station;

transmitting a first Validity Area Parameter ($VAP_1$) from said MSC-1 to said mobile station;

associating in said mobile station, said $SID_1$ and said $VAP_1$ with said $TMSI_1$;

determining whether said $TMSI_1$ received in said mobile station is valid;

storing said $TMSI_1$, said $VAP_1$, and said $SID_1$ in said mobile station upon determining that said $TMSI_1$ is valid, and utilizing said $TMSI_1$ to identify said mobile station; and     utilizing a permanent identification to identify said mobile station upon determining that said $TMSI_1$ is not valid.

8. The method of managing Temporary Mobile Station Identity (TMSI) parameters in a radio telecommunications network of claim 7 wherein said step of determining whether said $TMSI_1$ received in said mobile station is valid includes determining whether a currently received SID matches the $SID_1$ stored when the $TMSI_1$ was assigned.

9. The method of managing Temporary Mobile Station Identity (TMSI) parameters in a radio telecommunications network of claim 8 wherein said step of determining whether said $TMSI_1$ received in said mobile station is valid includes determining whether a currently received VAP matches the $VAP_1$ stored when the $TMSI_1$ was assigned.

10. The method of managing Temporary Mobile Station Identity (TMSI) parameters in a radio telecommunications network of claim 9 further comprising the steps of:

determining whether said mobile station is receiving a second VAP ($VAP_2$) from said MSC-2;

registering said mobile station in said MSC-2 utilizing said permanent identification upon determining that said mobile station is receiving $VAP_2$ from said MSC-2;

assigning, by said MSC-2, a second TMSI ($TMSI_2$) to said mobile station;

transmitting a second $VAP_2$ from said MSC-2 to said mobile station;

determining whether said $SID_1$ is still received by said mobile station;

transmitting a second SID ($SID_2$) number from said MSC-2 to said mobile station upon determining that said $SID_1$ is not being received by said mobile station;

associating in said mobile station, said $VAP_2$ and a received SID with said $TMSI_2$; and     utilizing said $TMSI_2$ to identify said mobile station while said mobile station receives said $VAP_2$ and said received SID associated with said $TMSI_2$.

11. A system for managing Temporary Mobile Station Identity (TMSI) parameters in a radio telecommunications network having a first mobile switching center (MSC), a second MSC, and a mobile station operating initially in a service area of said first MSC, said system comprising:

a first TMSI allocation unit within said first MSC which assigns a first TMSI to said mobile station;

a first Validity Area Parameter (VAP) transmitter within said first MSC which transmits a first VAP and said first TMSI from said first MSC to said mobile station;

a mobile station identity (MSI) controller within said mobile station which utilizes said first TMSI to identify said mobile station while said mobile station operates within the service area of said first MSC;

a second VAP transmitter within said second MSC which transmits a second VAP from said second MSC to said mobile station;

a VAP receiver within said mobile station for determining whether said mobile station is receiving said second VAP;

a TMSI status module within said mobile station for determining whether the received TMSI is valid;

a selector within said mobile station for selecting the received TMSI to identify said mobile station in a registration upon determining that the received TMSI is valid, and for selecting a permanent identification to identify said mobile station in said registration upon determining that the received TMSI is not valid.

12. The system for managing Temporary Mobile Station Identity (TMSI) parameters in a radio telecommunications network of claim 11 further comprising a second TMSI allocation unit within said second MSC which assigns a second TMSI to said mobile station upon receiving a registration from said mobile station that utilizes said permanent identification to identify said mobile station.

13. The system for managing Temporary Mobile Station Identity (TMSI) parameters in a radio telecommunications network of claim 11 wherein said first VAP transmitter includes means for transmitting said first VAP on the Digital Control Channel of said first MSC.

14. The system for managing Temporary Mobile Station Identity (TMSI) parameters in a radio telecommunications network of claim 13 wherein said second VAP transmitter includes means for transmitting said second VAP on the Digital Control Channel of said second MSC.

15. A system for managing Temporary Mobile Station Identity (TMSI) parameters in a radio telecommunications network having a first mobile switching center (MSC) which transmits a Validity Area Parameter (VAP), a second MSC which does not transmit a VAP, and a mobile station operating initially in a service area of said first MSC, said system comprising:

a first TMSI allocation unit within said first MSC which assigns a TMSI to said mobile station;

a first VAP transmitter within said first MSC which transmits said VAP and said TMSI from said first MSC to said mobile station;

a mobile station identity (MSI) controller within said mobile station which utilizes said TMSI to identify said mobile station while said mobile station operates within the service area of said first MSC;

a VAP receiver within said mobile station for determining whether said mobile station is still receiving said VAP;

a TMSI status module within said mobile station for invalidating said TMSI upon determining that said mobile station is not receiving said VAP; and a selector within said mobile station for selecting a permanent identification to identify said mobile station.

16. A system for managing Temporary Mobile Station Identity (TMSI) parameters in a radio telecommunications network having a visitor location register (VLR) which is associated with a mobile switching center/base station (MSC/BS) and a mobile station operating initially in a service area of said MSC/BS, said system comprising:

a TMSI allocation unit within said MSC/BS which assigns and transmits a TMSI to said mobile station;

a Validity Area Parameter (VAP) transmitter within said MSC/BS which transmits a VAP from said MSC/BS to said mobile station;

a System Identification number (SID) transmitter within said MSC/BS which transmits a SID from said MSC/BS to said mobile station;

a TMSI status module within said mobile station for receiving and determining whether said TMSI is valid;

a VAP receiver within said mobile station for receiving said VAP and sending said VAP to said TMSI status module;

a SID receiver within said mobile station for receiving said SID and sending said SID to said TMSI status module; and a mobile station identity (MSI) controller within said mobile station which utilizes said TMSI to identify said mobile station when said TMSI status module determines that said TMSI is valid, and which utilizes a permanent identification to identify said mobile station when said TMSI status module determines that said TMSI is not valid.

* * * * *

UNITED STATES PATENT AND TRADEMARK OFFICE
CERTIFICATE OF CORRECTION

PATENT NO. : 5,920,814

DATED : July 6, 1999

INVENTOR(S) : Francois Sawyer and Eric Turcotte

It is certified that error appears in the above-identified patent and that said Letters Patent is hereby corrected as shown below:

ON THE FRONT PAGE:

In the Assignee, change "Telefonaktiebolaget" to --Telefonaktiebolaget LM Ericsson (publ)--.

Signed and Sealed this

Twenty-eighth Day of December, 1999

Attest:

Q. TODD DICKINSON

*Attesting Officer*     *Acting Commissioner of Patents and Trademarks*